United States Patent
Schmidt et al.

(10) Patent No.: US 6,505,893 B2
(45) Date of Patent: Jan. 14, 2003

(54) VEHICLE BRAKE SYSTEM HAVING TWO BRAKE CIRCUITS

(75) Inventors: Frank Schmidt, Koblenz (DE); Steven Keen, Koblenz (DE); Ingo Montermann, Andernach (DE); Christoph Puderbach, Anhausen (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 09/860,764

(22) Filed: May 18, 2001

(65) Prior Publication Data

US 2001/0054843 A1 Dec. 27, 2001

(30) Foreign Application Priority Data

May 19, 2000 (DE) .......................................... 10024848

(51) Int. Cl.$^7$ ................................................. B60T 8/88
(52) U.S. Cl. ........................... 303/122.09; 303/127.03; 303/140; 303/146
(58) Field of Search .............................. 303/3, 15, 122, 303/122.03, 122.04, 122.05, 122.06, 122.09, 140, 146, 147, 167, 174, 186, 187, 188

(56) References Cited

U.S. PATENT DOCUMENTS

| | | | | |
|---|---|---|---|---|
| 3,888,328 A | * | 6/1975 | Leiber ......................... | 180/437 |
| 3,980,346 A | * | 9/1976 | Leiber ...................... | 188/181 A |
| 5,131,729 A | * | 7/1992 | Wetzel ..................... | 303/113.5 |
| 5,551,771 A | * | 9/1996 | Akuzawa et al. ............ | 303/186 |
| 5,938,296 A | * | 8/1999 | Nakazawa ................... | 180/197 |
| 5,941,608 A | * | 8/1999 | Campau et al. ........... | 303/113.4 |
| 6,059,379 A | * | 5/2000 | Deml et al. .............. | 188/1.11 E |
| 6,206,488 B1 | * | 3/2001 | Binbder et al. ......... | 303/122.04 |
| 6,238,019 B1 | * | 5/2001 | Okazaki et al. ........... | 303/113.2 |
| 6,266,601 B1 | * | 7/2001 | Soga et al. .................. | 180/197 |
| 6,299,261 B1 | * | 10/2001 | Weiberle et al. ........ | 303/122.04 |
| 6,302,497 B1 | * | 10/2001 | Takayama ................. | 303/113.3 |
| 6,312,065 B1 | * | 11/2001 | Freitag et al. .............. | 303/186 |

* cited by examiner

*Primary Examiner*—Christopher P. Schwartz
*Assistant Examiner*—Devon Kramer
(74) *Attorney, Agent, or Firm*—MacMillan, Sobinski & Todd, LLC

(57) ABSTRACT

Two brake circuits (1, 2) each comprise at least one wheel brake (VL, VR, HL, HR), a fluid control module (38, 42, 44; 40, 46, 48; 24) for fluid pressure control at the at least one wheel brake, and at least one brake line (50, 52; 54, 56) for connecting the fluid control module to the at least one wheel brake, such that only one brake line is connected to each wheel brake. In order to increase the safety of the vehicle brake system during braking with only one intact brake circuit, according to the invention in the vehicle brake system a sensor arrangement (58) for determining failure of a brake circuit is provided, and the fluid control modules in the event of failure of a brake circuit are capable of controlling the fluid pressure at the at least one wheel brake of the intact brake circuit in such a way that the gradient of a developing yawing moment (G) of a vehicle provided with the vehicle brake system does not exceed a predetermined maximum value.

21 Claims, 2 Drawing Sheets

VEHICLE BRAKE SYSTEM HAVING TWO BRAKE CIRCUITS

BACKGROUND OF THE INVENTION

The invention relates to a vehicle brake system having two brake circuits, which each comprise at least one wheel brake, a fluid control module for fluid pressure control at the at least one wheel brake, and at least one brake line for connecting the fluid control module to the at least one wheel brake, such that only one brake line is connected to each wheel brake.

Vehicle brake systems are generally split into two brake circuits so that, in the event of failure of one brake circuit, the vehicle provided with the brake system may still be decelerated by means of the second intact brake circuit and at least an adequate emergency braking action is ensured.

DIN 74000 defines five conventional ways of splitting a vehicle brake system into two brake circuits:

1) the II split according to FIG. 1, in which the wheel brakes VL and VR of a front axle V and the wheel brakes HL and HR of a rear axle H are associated in each case with one of two brake circuits 1 and 2,
2) the X split according to FIG. 2, in which each brake circuit 1 or 2 comprises the diagonally opposite wheel brakes VL and HR or VR and HL,
3) the HI split according to FIG. 3, in which the wheel brakes VL and VR of the front axle V are associated with both brake circuits 1 and 2 and the wheel brakes HL and HR of the rear axle H are both associated with one brake circuit 1,
4) the LL split according to FIG. 4, in which each brake circuit 1 and 2 controls the wheel brakes VL and VR of the front axle V and one of the brake wheels HL or HR of the rear axle H, and
5) the HH split according to FIG. 5, in which each brake circuit 1 and 2 acts upon all of the wheel brakes VL, VR, HL and HR.

Of said possibilities, according to "Kraftfahrtechnisches Taschenbuch" [Automotive Engineering Handbook], Bosch, 22nd edition, 1995, page 622, the II and the X split have gained acceptance. Given a minimum outlay for lines, hoses, detachable connections and static and/or dynamic seals, in terms of the risk of failure as a result of leakages they are comparable with a single-circuit brake system.

In order to comply with the statutory regulations regarding the emergency braking action in passenger cars, front-wheel drive cars are equipped with the X split. The II split is preferably used for rear-wheel drive passenger cars as well as medium- and heavy-duty utility vehicles.

In light utility vehicles, on the other hand, the HI, LL and HH splits are used. This is necessary because light utility vehicles, as designed, have a less advantageous chassis layout, e.g. with regard to axle load distribution, wheelbase and roll radius, with the result that braking with only one brake circuits generates in the vehicle a not inconsiderable torque about its vertical axis, the so-called yawing moment G illustrated in FIG. 1. Said high yawing moment may lead to potentially hazardous driving situations. In the case of the HI, LL and HH splits, both wheel brakes of the front axle are connected to each brake circuit so that, even in the event of failure of one brake circuit, the front axle is always uniformly braked and a high yawing moment of the light utility vehicle either does not occur at all or is compensated relatively well.

The HI, LL and HH splits do however present problems because, in the event of failure of both wheel brakes of an axle, e.g. as a result of thermal overstressing, total failure of the brake system may occur. Furthermore, with the HI, LL and HH split the outlay in terms of the number of brake lines and the connection of two brake lines to the wheel brakes is higher than with the II and X split. The higher number of brake lines and connections also increases the risk of leakages.

For passenger cars with II and X brake circuit splits, control units of an antiblocking system (ABS), of traction control (ASR) or of an electronic stability program (ESP) are being developed and produced in large numbers. A special feature of a brake system with an HI, LL or HH split is that one wheel brake is controlled by two brake circuits. It is therefore impossible to use standard ABS, ASR or ESP control units and necessary to develop separate control units. For said reason, adding ABS, ASR or ESP to a brake system with an HI, LL or HH split is possible only with a high outlay.

OBJECT OF THE INVENTION

The object of the invention is to increase the safety of a vehicle brake system during braking with only one intact brake circuit and, in particular, to enable the use of a vehicle brake system with an II or X split also in light utility vehicles.

SOLUTION ACCORDING TO THE INVENTION

The object is achieved according to the invention by a vehicle brake system of the type described initially, in which a sensor arrangement for determining failure of a brake circuit is provided, and the fluid control modules in the event of failure of a brake circuit are capable of controlling the fluid pressure at the at least one wheel brake of the intact brake circuit in such a way that the gradient of a developing yawing moment of a vehicle provided with the vehicle brake system does not exceed a predetermined maximum value.

The object is moreover achieved by a method, whereby a sensor arrangement for determining failure of a brake circuit is provided, failure of a brake circuit is determined and the fluid pressure at the at least one wheel brake of the intact brake circuit is controlled so that the gradient of a developing yawing moment of a vehicle provided with the vehicle brake system does not exceed a predetermined maximum value.

According to the invention, the increase of the yawing moment of the vehicle which occurs during braking with only one intact brake circuit is slowed down by suitable fluid pressure modulation at the wheel brake(s) of the intact brake circuit and/or said increase of the yawing moment is prevented from exceeding a value which would lead to a potentially hazardous driving situation. For example, a pressure rise, which is flatter compared to a normal braking operation, is generated at the wheel brake of a front wheel so that the maximum brake pressure there is reached slightly later. The yawing moment is substantially proportional to said brake pressure and therefore has, in accordance with the invention, a lower gradient. The vehicle therefore starts to yaw only slowly. Said yawing behaviour may be brought under control by a driver more easily than a sudden "swerving" of the vehicle as a result of a rapidly increasing yawing moment.

The fluid pressure modulation differs from that of an ABS, ASR or ESP modulation with an intact vehicle brake system in that the braking deceleration at individual wheel brakes is reduced, in particular at the wheel brake of the front wheel, and/or increased, in particular at the wheel brake of the rear wheel.

In said case, a "standard" reduction or increase for each emergency braking situation may be effected, which is constant or dependent only upon parameters such as the speed or loaded state of the vehicle. Alternatively, the yawing behaviour of the vehicle may be determined, e.g. by means of a sensor for the rate of turning and/or yawing of the vehicle about the vehicle vertical axis, and used as a basis for determining a reduction and/or increase of the braking decelerations at the wheel brake(s) which is "individually" adapted to the yawing behaviour of the individual braking situation. The braking decelerations are at the same time controlled so as to comply with the statutory regulations regarding the residual deceleration to be achieved in the event of a fault (ECE13 regulation).

In an advantageous form of application of the invention, four wheel brakes are disposed in pairs at a front and a rear axle of a vehicle provided with the vehicle brake system and the, in each case, diagonally opposite wheel brakes are associated with a brake circuit. Thus, an X split of the brake circuits as described initially is provided, with which the invention may be used in a particularly advantageous manner because, with said X split, in the event of failure of a brake circuit it is always only one front wheel and the diagonally opposite rear wheel which are braked. The vehicle is therefore decelerated in an extremely asymmetrical manner. By virtue of the fluid pressure modulation according to the invention said asymmetrical deceleration may be prevented, reduced or compensated in such a way that the vehicle, during braking with only one brake circuit, remains in a stable driving condition.

The vehicle brake system according to the invention may be assembled in a particularly inexpensive manner from standard components by combining the two fluid control modules in a conventional 4-channel ABS control unit, and a controller of the ABS control unit is geared towards receiving signals from the sensor arrangement and, in the event of failure of a brake circuit, controlling the fluid pressure at the wheel brakes of the intact brake circuit. As a controller is already provided with ABS control units, the fluid pressure modulation according to the invention is already obtainable by altering the software for the controller. Instead of an ABS control unit, the control unit of an ASR or ESP system or of an electrohydraulic brake (EHB) may be used.

In a particularly simple embodiment of the invention, the fluid control modules in the event of failure of a brake circuit are capable of modulating the fluid pressure at the wheel brake of the front axle of the intact brake circuit. During braking a high braking deceleration generally acts upon the wheel brake of the front axle because of a pitching motion of the vehicle and may generate a high yawing moment. It may therefore be sufficient to modulate the fluid pressure only at the front axle and hence reduce the yawing moment.

In comparison to a conventional ABS braking operation, modulation at the wheel brake of the front axle is advantageously effected by reducing the fluid pressure, in particular by slowing down a pressure build-up and/or by generating a short pressure reduction phase. The braking effect of the wheel brake is admittedly reduced thereby but this is admissible and meaningful because the vehicle is consequently stabilized and a potentially hazardous driving situation is avoided.

The fluid control modules in the event of failure of a brake circuit are advantageously capable of controlling the fluid pressure at the wheel brakes of the intact brake circuit in such a way that a wheel with a higher wheel load experiences less braking deceleration than a wheel with a lower wheel load. The transmissible friction force at the wheel is the product of friction resistance and normal force (wheel load). Accordingly, a wheel with a higher wheel load may transmit a higher friction force and leads then to a higher braking deceleration. Given an asymmetrical load distribution (II split) or asymmetrical emergency braking (X split), the asymmetrical load distribution therefore leads to an asymmetrical braking deceleration and hence a yawing moment. According to the invention, the asymmetrical braking deceleration is reduced and so the occurrence of a potentially hazardous yawing moment is avoided.

According to the invention, rotational speed sensors of a conventional ABS brake system are advantageously used as a sensor arrangement and the fluid control modules are capable of comparing the slip values of the wheels with one another and/or with stored slip values of a conventional ABS braking operation and, in the event of an extreme variation of the slip values, of determining that one wheel of a brake circuit is not being braked, i.e. said brake circuit has failed. There is therefore no need for separate sensors for determining a brake circuit failure. Alternatively or additionally, sensors specially geared towards determining a brake circuit failure, e.g. pressure sensors at the brake lines, may be provided.

The vehicle brake system according to the invention is used particularly advantageously in a utility vehicle, in particular a light utility vehicle. In utility vehicles the wheel loads, because of asymmetrical loading, often differ widely and in the event of emergency braking this may lead to an undesirably fast or even potentially hazardous increase of the yawing moment. Said risk is reduced according to the invention. Previously it was not possible to use a vehicle brake system with an II or X split in a light utility vehicle. Said use is now possible with the brake system according to the invention.

The method according to the invention is advantageously developed with the steps: provision of a rotational speed sensor at each wheel brake, determination of the slip values of the rotational speed sensors, comparison of the slip values of the wheels with one another and/or with stored slip values of a conventional ABS braking operation and determination of the variation of the values. In said case, in a brake system with an X split the slip values of the wheels of an axle are compared. Should they reveal a different turning behaviour of the wheels, the slip values of the diagonally opposite wheels are additionally compared in order to obtain further confirmation or verification that a brake circuit has failed and its wheels are no longer being braked.

The manner, described in claims 7 and 10, of using rotational speed sensors to determine the failure of a brake circuit may also be used independently of the features described in the characterizing portion of claim 1.

DESCRIPTION OF AN EMBODIMENT

Figure 1:
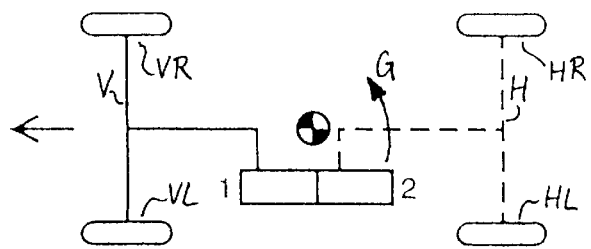
FIGS. 1 to 5 show diagrammatic plan views of the brake circuit splits of vehicle brake systems of prior art, such as were described initially.
Figure 2:
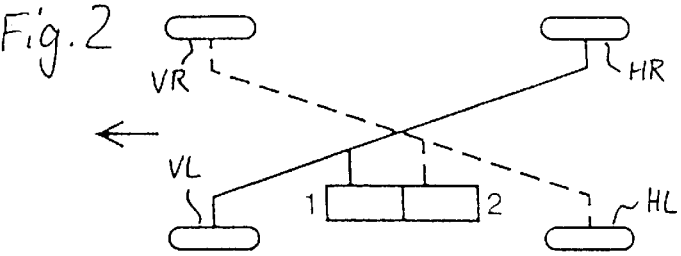
Figure 3:
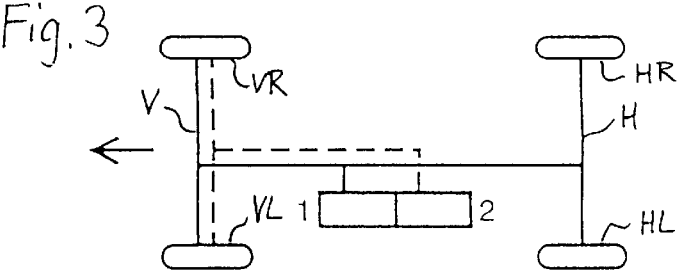
Figure 4:
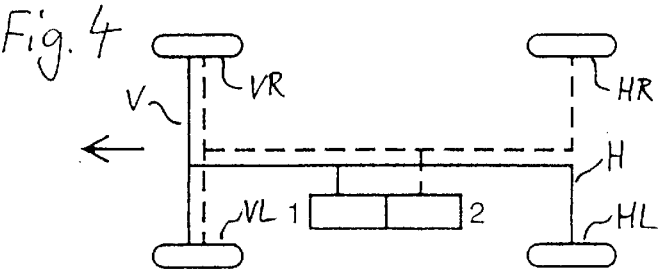
Figure 5:
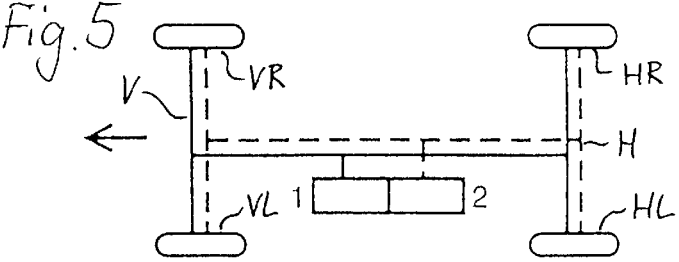
Figure 6:
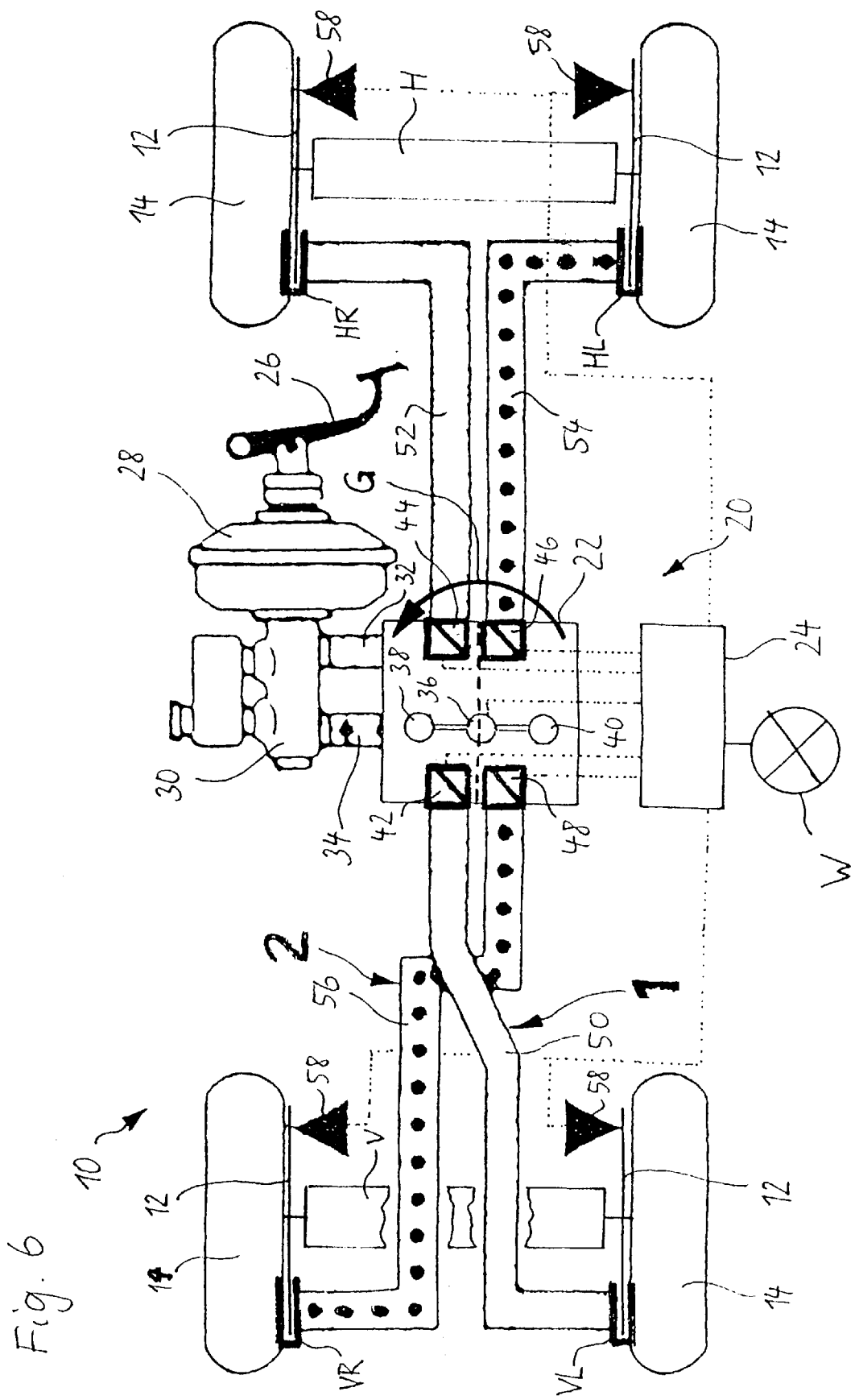
FIG. 6 shows a diagrammatic plan view of an embodiment of a vehicle brake system according to the invention.

FIG. 6 illustrates a vehicle brake system 10 comprising four wheel brakes VL, VR, HL and HR at a front axle V and a rear axle H. The wheel brakes VL, VR, HL and HR act in each case upon a brake disk 12 which is non-rotatably connected to a wheel 14. The wheels 14 are in a conventional manner mounted rotatably on the appropriate front and rear axle, V and H respectively.

The vehicle brake system 10 comprises an ABS control unit 20 comprising a hydraulic unit 22 and a controller 24, which is at least electrically connected to the latter by lines illustrated by means of dots.

In a conventional manner a brake pedal 26, a pneumatic brake booster 28 operable thereby and a master cylinder 30 mechanically coupled to the latter are further provided in the vehicle brake system 10. The master cylinder 30 comprises two pressure chambers (not shown in detail), which are fluidically connected by a first pressure line 32 and a second pressure line 34 to the hydraulic unit 22.

The vehicle brake system 10 is split into a first brake circuit 1 and a second brake circuit 2, and the first pressure line 32 and second pressure line 34 are in each case part of one of said brake circuits 1 or 2.

Disposed in the hydraulic unit 22 are two pumps 38 and 40, which are driven by a motor 36, and four valve arrangements 42, 44, 46 and 48, by means of which brake fluid supplied from the master cylinder 30 to the hydraulic unit 22 is apportioned to the individual wheel brakes VL, VR, HL and HR. The hydraulic unit is moreover used to convey brake fluid away from the wheel brakes VL, VR, HL and HR and back to the master cylinder 30. The hydraulic unit 22 operated by the controller 24 therefore in a conventional manner guarantees an ABS function, which prevents blocking of the wheels 14 during braking.

The pump 38 as well as the valve arrangements 42 and 44 are associated with the brake circuit 1 and the pump 40 as well as the valve arrangements 46 and 48 are associated with the brake circuit 2. Brake lines 50, 52, 54 and 56 are connected to the hydraulic unit 22 and lead in each case individually to the wheel brakes VL, HR, HL and VR. The vehicle brake system 10 therefore has an X split in accordance with DIN 74000.

Disposed at each of the wheels 14 is a rotational speed sensor 58. Each rotational speed sensor 58 is connected to the controller 24 by means of lines likewise illustrated by dots.

In the illustrated vehicle brake system 10, failure of one of the brake circuits, e.g. of the brake circuit 1, may be detected by means of the rotational speed sensors 58 and the controller 24 in that slip values of a wheel, which are determined by the rotational speed sensors 58, are compared with those of another wheel and/or with stored slip values of a conventional ABS braking operation. A failure that is detected by means of the rotational speed sensors 58 and the controller 24 can by displayed to the driver by means of a warning device such as a warning lamp W connected to the controller 24. If the slip values of one and/or both wheels of wheel brakes of one brake circuit differ widely from those of the other circuit or if said values diverge from one another over time, this is an indication that the wheels of said brake circuit are no longer being braked, i.e. the brake circuit has failed. In the example, this would mean that the slip values of the wheels 14 of the wheel brakes VL and HR (brake circuit 1) vary from those of the wheels 14 of the wheel brakes VR and HL (brake circuit 2).

If the failure of brake circuit 1 is detected in said manner, then the controller 24 by means of the pump 40 and/or the valve arrangements 46 and 48 controls the fluid pressure at the wheel brakes VR and HL (brake circuit 2) in such a way that the gradient of a developing yawing moment G of the vehicle provided with the vehicle brake system 10 does not exceed a predetermined potentially hazardous maximum value. In said case, the absolute value of the yawing moment may alternatively or simultaneously be limited.

In said case, particularly the pressure build-up of the fluid pressure at the wheel brake VR is slowed down and/or one or more short pressure reduction phases are generated there so that the braking deceleration produced by the wheel brake VR is not substantially greater than the braking deceleration produced by the wheel brake HL. The vehicle brake system 10 is therefore controlled in such a way that the braking decelerations, which are produced by the individual wheel brakes VR and HL of the still intact brake circuit 2 via the associated wheels 14, have only a low spread relative to one another.

Said spread may be determined and monitored in that the controller 24 compares the slip values of the rotational speed sensor 58 at the wheel brake VR with those of the rotational speed sensor 58 at the diagonally opposite second wheel brake HL of the intact brake circuit 2.

What is claimed is:

1. A vehicle brake system (10) having two brake circuits (1, 2), which each comprise:

at least one wheel brake (VL, HR; VR, HL);

a fluid control module (38, 42, 44; 40, 46, 48; 24) for fluid pressure control at the at least one wheel brake (VL, HR; VR, HL); and at least one brake line (50, 52; 54, 56) for connecting the fluid control module (38, 42, 44; 40,46, 48; 24) to the at least one wheel brake (VL, HR; HL, VR), such that only one brake line (50; 52; 54; 56) is connected to each wheel brake (VL; HR; HL; VR), characterized in that a sensor arrangement (58) for determining failure of a brake circuit (1; 2) is provided, and the fluid control modules (38, 42, 44; 40, 46, 48; 24) in the event of failure of a brake circuit (1; 2) are capable of controlling the fluid pressure at the at least one wheel brake (VR, HL; VL, HR) of the intact brake circuit (2; 1) in such a way that the gradient of a developing yawing moment (G) of a vehicle provided with the vehicle brake system (10) does not exceed a predetermined maximum value.

2. A vehicle brake system according to claim 1, characterized in that four wheel brakes (VL, VR, HL, HR) are disposed in each case as a pair at a front axle (V) and a rear axle (H) of a vehicle provided with the vehicle brake system (10) and the, in each case, diagonally opposite wheel brakes (VL, HR; VR, HL) are associated with a brake circuit (1; 2) (X brake circuit split).

3. A vehicle brake system according to claim 2, characterized in that the two fluid control modules (38, 42, 44; 40, 46, 48; 24) are combined in a conventional 4-channel ABS control unit (22, 24), and a controller (24) of the ABS control unit (22, 24) is geared towards receiving signals from the sensor arrangement (58) and, in the event of failure of a brake circuit (1; 2), controlling the fluid pressure at the wheel brakes (VR, HL; VL, HR) of the intact brake circuit (2; 1).

4. A vehicle brake system according to claim 2, characterized in that the fluid control modules (38, 42, 44; 40, 46, 48; 24) in the event of failure of a brake circuit (1; 2) are capable of modulating the fluid pressure at the wheel brake (VR; VL) of the front axle (V) of the intact brake circuit (2; 1).

5. A vehicle brake system according to claim 4, characterized in that the fluid control modules (38, 42, 44; 40, 46, 48; 24) in the event of failure of a brake circuit (1; 2) are capable of reducing the fluid pressure at the wheel brake (VR; VL) of the front axle (V) of the intact brake circuit (2; 1), in comparison with a conventional ABS braking operation, in particular at least one of slowing down a pressure build-up and generating a short pressure reduction phase.

6. A vehicle brake system according to claim 2 characterized in that the fluid control modules (38, 42, 44; 40, 46, 48; 24) in the event of failure of a brake circuit (1; 2) are capable of controlling the fluid pressure at the wheel brakes (VR, HL; VL, HR) of the intact brake circuit (2; 1) in such a way that a wheel (14) with a higher wheel load experiences less braking deceleration than a wheel (14) with a lower wheel load.

7. A vehicle brake system according to claim 1 characterized in that rotational speed sensors (58) of a conventional ABS brake system are provided as a sensor arrangement and the fluid control modules (38, 42, 44; 40.1 46, 48; 24) are capable of comparing the slip values of the rotational speed sensors (58) of wheels (14) with one another and/or with stored slip values of a conventional ABS braking operation and, given a predetermined variation of the slip values, of determining that one wheel (14) of a brake circuit is not being braked and said brake circuit (1; 2) has failed.

8. A vehicle brake system according to claim 1 characterized in that the vehicle brake system (10) is suitable for installation in a utility vehicle, in particular a light utility vehicle.

9. A method of controlling a vehicle brake system (10) having the step:
providing a vehicle brake system (10) having two brake circuits (1; 2), which each comprise at least one wheel brake (VL, HR; VR, HL), a fluid control module (38, 42, 44; 40, 46, 48; 24) for fluid pressure control at the at least one wheel brake (VL, HR; VR, HL), and at least one brake line (50, 52; 54, 56) for connecting the fluid control module (38, 42, 44; 40, 46, 48; 24) to the at least one wheel brake (VL, HR; HL, VR), such that only one brake line (50; 52; 54; 56) is connected to each wheel brake (VL; HR; HL; VR),
characterized by the steps:
providing a sensor arrangement (58) for determining failure of a brake circuit (1; 2),
determining failure of a brake circuit (1; 2), and
controlling the fluid pressure at the at least one wheel brake (VR, HL; VL, HR) of the intact brake circuit (2; 1) so that the gradient of a developing yawing moment (G) of a vehicle provided with the vehicle brake system (10) does not exceed a predetermined maximum value.

10. The method according to claim 9, characterized in that the step of determining failure of a brake circuit (1; 2) comprises the steps:
providing a rotational speed sensor (58) at each wheel brake (VL, VR, HL, HR),
determining the slip values of the rotational speed sensors (58),
comparing the slip values of wheels (14) with at least one of one another and with stored slip values of a conventional ABS braking operation, and
determining the variation of the slip values.

11. A vehicle brake system comprising:
two brake circuits, each brake circuit including:
a wheel brake,
a respective brake line connected to the wheel brake, and
a fluid control module connected by the brake line to the wheel brake for controlling fluid pressure at the wheel brake, the fluid control module for each of the two brake circuits being capable, in the event of failure of the other of the two brake circuits, of controlling the fluid pressure at the wheel brake of the associated non-failed brake circuit in such a way that the gradient of a developing yawing moment of a vehicle provided with the vehicle brake system does not exceed a predetermined maximum value; and
a sensor arrangement for determining failure of a brake circuit.

12. A vehicle brake system according to claim 11, the wheel brake of each of the brake circuits being a first wheel brake, each of the brake circuits further including a second wheel brake, the first wheel brake of one of the two brake circuits being at a left end of a front axle of a vehicle provided with the vehicle brake system and the associated second wheel brake being at a right end of a rear axle of the vehicle, the first wheel brake of the other of the two brake circuits being at a right end of the front axle and the associated second wheel brake being at a left end of the rear axle.

13. A vehicle brake system according to claim 12, the two fluid control modules being combined in a conventional 4-channel ABS control unit, the ABS control unit receiving signals from the sensor arrangement and, in the event of failure of a brake circuit, controlling the fluid pressure at the wheel brakes of the operable brake circuit.

14. A vehicle brake system according to claim 12, the fluid control module of one brake circuit being capable of modulating the fluid pressure at the associated first wheel brake in the event of failure of the other brake circuit.

15. A vehicle brake system according to claim 14, the fluid control module of each of the two brake circuits being capable, in the event of failure of the other of the two brake circuits, of controlling the fluid pressure at the associated first wheel brake relative to the associated second wheel brake by at least one of slowing down a pressure build-up and generating a short pressure reduction phase.

16. A vehicle brake system according to claim 12, each wheel brake being associated with a respective wheel of a vehicle on which the vehicle brake system is installed, each wheel of the vehicle supporting a respective load, the fluid control module of an operable one of the two brake circuits being capable, in the event of failure of the other of the two brake circuit, of controlling the fluid pressure at the wheel brakes of the operable brake circuit in such a way that a wheel with a higher wheel load experiences less braking deceleration than a wheel with a lower wheel load.

17. A vehicle brake system according to claim 11, further including a plurality of rotational speed sensors of a conventional ABS brake system provided as a second sensor arrangement, each speed sensor producing a signal indicative of the rotational speed of an associated vehicle wheel from which a slip value of each vehicle wheel can be calculated, the fluid control modules being capable of at least one of comparing the slip values of the wheels with one another and comparing the slip values of the wheels with stored slip values of a conventional ABS braking operation, the fluid control modules further being capable, given a predetermined variation of the slip values, of determining that one wheel of a brake circuit is not being braked and the brake circuit associated with the wheel not being braked has failed.

18. A vehicle brake system according to claim 11 suitable for installation in a utility vehicle.

19. A method of controlling a vehicle brake system having two brake circuits, each brake circuit having at least one wheel brake, a fluid control module for fluid pressure control at the at least one wheel brake, and at least one brake line for connecting the fluid control module to the at least one wheel brake, such that only one brake line is connected to each wheel brake, the vehicle brake system further having a sensor arrangement for determining failure of a brake circuit, the method including the steps of:

determining that one of the brake circuits has failed; and controlling the fluid pressure at the at least one wheel brake of the other of the brake circuits so that the gradient of a developing yawing moment of a vehicle provided with the vehicle brake system does not exceed a predetermined maximum value.

20. The method according to claim 19 when the brake system further includes a rotational speed sensor at each wheel, the step of determining failure of a brake circuit includes the steps of:

determining slip values associated with each wheel from the rotational speed sensors;

comparing the slip values of wheels with at least one of one another and with stored slip values of a conventional ABS braking operation; and determining the variation of the slip values.

21. A vehicle brake system comprising:

a first brake circuit;

a second brake circuit; and a sensor arrangement for determining failure of a brake circuit, each of the brake circuits including:

at least one wheel brake, a fluid control module associated with the at least one wheel brake of the same brake circuit, the fluid control module being capable of controlling fluid pressure at the associated at least one wheel brake, in event that failure of the other brake circuit is sensed by the sensor arrangement, in such a way that the gradient of a developing yawing moment of a vehicle on which the brake system is installed does not exceed a predetermined maximum value; and at least one brake line for connecting the fluid control module to the associated at least one wheel brake, such that only one brake line is connected to each wheel brake.

* * * * *